United States Patent Office 2,793,937
Patented May 28, 1957

2,793,937

PROCESS FOR PRODUCING CHROMYL CHLORIDE

Robert C. East, Baltimore, Md., assignor, by mesne assignments, to Allied Chemical and Dye Corporation No Drawing. Application March 11, 1954,
Serial No. 415,697

16 Claims. (Cl. 23—203)

This invention relates to the production of chromyl chloride, and has for its object the provision of an improved process for producing chromyl chloride of high purity and in very good yield. The process of the invention comprises the reaction of chromic anhydride while in solution in chromyl chloride with a suitable chloride, and the separation of chromyl chloride of high purity from the reaction. In an especially advantageous embodiment of the invention, a concentrated solution of chromic anhydride in chromyl chloride is reacted with an inorganic chloride in the presence of a dehydrating agent to promote layer separation producing chromyl chloride practically in quantitative yield and of very high purity.

Prior investigators state that chromyl chloride is generally prepared by the reaction of a compound of hexavalent chromium, a chlorine compound and a dehydrating agent. As the compound of hexavalent chromium, they have used chromic anhydride, sodium and potassium dichromate, lead chromate, alkali or alkaline earth chromates. As the chlorine compound they have employed chlorine, chlorides of the alkali and alkali earths, hydrochloric acid, hydrogen chloride, chlorosulfonic acid, ferric or chromic chloride, phosphorus pentachloride, carbon tetrachloride, pyrosulfuryl chloride, acetyl chloride, and the like. As the dehydrating agent they have suggested sulfuric acid, acetic acid or phosphoric acid; furthermore they have suggested that pyrosulfuryl chloride or chlorosulfonic acid may serve as both condensing agent and source of chlorine. Chromyl chloride is also reportedly formed by the action of chlorine on chromic oxide, by the heating of chromic perchlorate, or by the action of oxygen on chromic chloride.

The processes heretofore used or proposed have been unsuccessful because of poor yields and resulting impure products, usually requiring distillation with a further diminution in yield. Due to these drawbacks, the production of chromyl chloride as a commercial chemical has been hindered.

This invention is based on my discovery that chromyl chloride can dissolve large quantities of chromic anhydride at normal temperatures and that while in solution the chromic anhydride reacts effectively with an inorganic chloride to produce chromyl chloride. Chromyl chloride is represented by the formula $CrO_2Cl_2$, and chromic anhydride by the formula $CrO_3$, (also called chromium (VI) oxide, or simply chromic acid). The reaction which takes place in the solution is believed to be as follows when hydrogen chloride (HCl) is used as the chloride:

(1) $CrO_3 + 2HCl \rightarrow CrO_2Cl_2 + H_2O$

The above reaction is driven by the formation of a water-phase which separates as an upper layer. By way of further explanation, certain quantities of the reactants may remain dissolved in the water-phase, and hence cause undesirable side reactions. This is why, in the preferred form of my invention, I use a special reagent to reduce the solubility of the reactants in the aqueous phase, and thus obtain yields of 98% or more.

One of the important aspects of the invention is that it can be carried out at ordinary temperatures resulting in two immiscible liquids, a chromyl chloride liquid phase and an aqueous liquid phase, which separate readily permitting recovery of pure chromyl chloride, and removal of the aqueous phase with the dehydrating agent when used.

In the following general discussion, the invention will be described, by way of example, in connection with the use of hydrogen chloride as the inorganic chloride. The hydrogen chloride may be from any suitable source, such as hydrogen chloride produced by the combination of hydrogen and chlorine or the action of sulfuric acid on a chloride.

In the practice of the invention, the solution of chromic anhydride in chromyl chloride proceeds rapidly and smoothly. Hence, while a solution of any concentration may be used, it is usual to employ a saturated solution or even a slurry containing excess chromic anhydride in chromyl chloride in order to obtain a high absorption rate for hydrogen chloride. The concentration of such slurries is limited only by the ability to agitate the suspension adequately. However, it is my belief that such excess chromic anhydride does not react directly under these slow HCl addition rates and that the process operates through the absorption of hydrogen chloride in a solution of chromic anhydride in chromyl chloride, according to the reaction above. The formation of water in reaction (1), without using a dehydrating agent, results in a reduced yield as will be shown hereinafter.

The yields may be increased by the use of a dehydrating agent which decreases the amount of reactants dissolved in the aqueous layer. For this purpose I prefer as a dehydrating agent chlorosulfonic acid, but sulfuric acid, oleum, phosphoric acid and similar reagents may be employed.

The preferred form of my invention is thus indicated by the chemical equations:

(2) $CrO_3 + HCl + SO_3HCl \xrightarrow{\text{in } CrO_2Cl_2} CrO_2Cl_2 + H_2SO_4$ (3) $CrO_3 + 2HCl \xrightarrow{\text{in } CrO_2Cl_2} CrO_2Cl_2 + H_2O$ The concentration of the residual acid in the aqueous layer formed as a result of the coworking of the reactions (2) and (3) is of importance. If the acid concentration is too high, solid chromyl sulfate complexes are formed which do not permit effective separation. If the acid concentration is too low, there is considerable loss of yield through reduction of chromium and evolution of chlorine. Concentrations between 50% and 85% $H_2SO_4$ in the aqueous layer have generally been found satisfactory. Further, the solubility of chromic anhydride in the aqueous layer is at a minimum in this range of acid concentration.

The purity of the product is demonstrated by chemical analysis. Thus, in a group of samples withdrawn from a reaction, the analyses and calculated purities were:

|                  | Theory | 1     | 2     | 3     | 4     | 5     |
|------------------|--------|-------|-------|-------|-------|-------|
| Percent Cr       | 33.57  | 33.45 | 33.35 | 33.54 | 33.59 | 33.55 |
| Percent Cl       | 45.77  | 45.43 | 45.48 | 45.45 | 45.68 | 45.72 |
| Percent $CrO_2Cl_2$ |        | 99.25 | 99.36 | 99.29 | 99.80 | 99.88 |

The chromyl chloride produced according to the invention is a clear cherry-red liquid, stable when stored in the dark and giving virtually no residue on distillation.

The following is an example of the manufacture of chromyl chloride in a process according to the invention:

A batch is started by charging a 250 gallon reactor, glass-lined or of other suitable corrosion-resistant construction, with 200 pounds of chromyl chloride, preferably prepared in a preceding batch. 200 pounds of chromic anhydride is added and the batch is agitated to dissolve the anhydride and promote the reaction. Hydrogen chloride gas is added at a rate of 63.4 pounds per hour and chlorosulfonic acid at the rate of 35.3 pounds per hour. Cooling is used to keep the reactor temperature at or below 38° C. After two hours, 400 pounds of additional chromic anhydride is added to the reactor, and after four more hours, 760 additional pounds. Addition of hydrogen chloride is continued until dense fumes indicate the close of the reaction. Agitation is stopped, the batch is settled for one-half hour, and a sample withdrawn for analysis. If the product is below theory in Cr content, excess $CrO_3$ is added at the rate of 8 pounds for each 0.1% deficiency in Cr. If the product is above theory, gassing with HCl is resumed until the analysis is correct. The batch is settled and the chromyl chloride tapped off. 200 pounds is left in the reactor if desired for the start of another batch. The acid layer containing the water from the reaction may be withdrawn and used in any way suitable. Alternatively, the acid layer may be allowed to accumulate for several runs before withdrawal. The yield is 2000 pounds of chromyl chloride of 99.5% purity (95% yield on the chromic anhydride employed). The foregoing operation may be carried out by using oleum, sulfuric acid or phosphoric acid in place of chlorosulfonic acid. While hydrogen chloride is the preferred chloride, I may also use phosphorus oxychloride.

The following is an example of the manufacture of chromyl chloride in a process carried out without the use of a dehydrating agent as exemplified by reaction 3.

An agitated mixture of $CrO_3$ and $CrO_2Cl_2$ (150 pounds of each) was treated with hydrogen chloride gas. The absorption of hydrogen chloride was rapid and complete. The solution was cooled to below 20° C. and a total of 450 pounds of additional chromic anhydride was added at intervals as the original anhydride dissolved. Hydrogen chloride addition was continued. A the end of the reaction, a net yield of 598 pounds of chromyl chloride of good quality was obtained (64.4% yield).

When the reaction, as in this example and as represented by reaction 3, is modified by the addition of 85 pounds of concentrated sulfuric acid to the reactor at the start, followed by 270 pounds of additional acid during the reaction, concurrent with the addition of chromic anhydride, the yield was increased to 911 pounds or 98.0%. The chromyl chloride produced was of the same excellent purity as in the previous example, about 99.5% pure.

The operation may be carried out batchwise, continuously or semi-continuously.

With some variations in the process I may produce chromyl bromide and chromyl fluoride, and even the previously unknown chromyl compounds of pseudo-halogens, such as chromyl cyanate and chromyl azide. The principal variations should take into account the different physical states, i. e., solid or gaseous, of these compounds at room temperature and the modifications required. My invention also comprehends the carrying out of various organic and inorganic reactions in the reacting media, using the chromyl chloride as formed to dissolve or react with other compounds in solution.

I claim:

1. The improved process for the production of substantially pure chromyl chloride comprising dissolving chromic anhydride in chromyl chloride produced in a previous operation in substantially large amount to provide a concentrated solution, introducing into the solution an inorganic chloride to effect a reaction with the chromic anhydride forming chromyl chloride and resultant formation of a body of liquid chromyl chloride comprising the original chromyl chloride and the produced chromyl chloride and another liquid body comprising aqueous constituents of the reaction, separating the two bodies, and using a portion of the chromyl chloride body for a repetition of the operation.

2. In the process of claim 1, using a chloride of the group consisting of hydrogen chloride and phosphorus oxychloride, and incorporating an acid agent in the chromyl chloride solution, the spent agent accumulating in the body containing aqueous constituents.

3. In the process of claim 1, incorporating with the solution an agent of the group consisting of oleum, sulfuric acid, chlorosulfonic acid and phosphoric acid, said agent together with its acquired water of the reaction and formed salts, if any, accumulating in the body containing aqueous constituents.

4. The improved process for the production of a chromyl chloride comprising dissolving chromic anhydride in chromyl chloride and forming a saturated solution, introducing into the solution a dehydrating agent of the group consisting of oleum, sulfuric acid and chlorosulfonic acid, and introducing an inorganic chloride into the solution to effect a practically complete reaction with the chromic anhydride forming chromyl chloride and resultant formation of one layer of liquid chromyl chloride comprising the original chromyl chloride and the produced chromyl chloride and another liquid layer comprising sulfuric acid and absorbed water, the amount of dehydrating agent incorporated in the solution being such that at the conclusion of the reaction the acid layer comprises from 50% to 85% by weight of sulfuric acid, and using a part of the chromyl chloride for a repetition of the operation.

5. The improved process for the production of chromyl chloride comprising initially dissolving chromic anhydride in chromyl chloride produced in a previous operation in substantially large amount to produce a concentrated solution, introducing into the solution hydrogen chloride and an agent of the group consisting of oleum, sulfuric acid and chlorosulfonic acid, the reacting constituents forming a liquid body of substantially pure chromyl chloride including the newly formed chromyl chloride and an aqueous phase body comprising the formed water and dehydrating agent, and removing chromyl chloride from the liquid body thereof.

6. In the process of claim 5, using the remaining body of chromyl chloride to dissolve additional chromic anhydride in a repetition of the operation.

7. In the process of claim 5, using a slurry of chromic anhydride and chromyl chloride produced in a previous operation.

8. In the process for the direct production of substantially pure chromyl chloride in which chromic anhydride is reacted with an inorganic chloride; the improvement which comprises initially dissolving the chromic anhydride in chromyl chloride produced in a previous operation, the amount of chromic anhydride dissolved in the chromyl chloride being sufficiently large to produce a concentrated solution of the chromic anhydride in the chromyl chloride.

9. The process of claim 8 in which the reaction of the chromic anhydride and inorganic chloride is carried out in a slurry of chromic anhydride and chromyl chloride produced in a previous operation.

10. The process of claim 8 in which the reaction between the chromic anhydride and the inorganic chloride is carried out in the presence of a dehydrating agent to promote layer separation.

11. The process of claim 10 in which the dehydrating agent is one from the group consisting of oleum, sulfuric acid, chlorosulfonic acid and phosphoric acid.

12. The process of claim 8 in which the inorganic chloride is one from the group consisting of hydrogen chloride and phosphorus oxychloride.

13. The process of claim 12 in which the reaction between the chromic anhydride and the inorganic chloride is carried out in the presence of a non-alkaline dehydrating agent which is inert to chromyl chloride to promote layer separation.

14. The process of claim 13 in which the solution of chromic anhydride in chromyl chloride is saturated with respect to chromic anhydride.

15. The process of claim 8 in which the reaction of the chromic anhydride and inorganic chloride is carried out in a slurry of chromic anhydride in chromyl chloride produced in a previous operation, the inorganic chloride is hydrogen chloride, and the reaction is carried out in the presence of chlorosulfonic acid.

16. The improved process for the production of chromyl chloride comprising initially dissolving chromic anhydride in chromyl chloride in substantially large amount to form a concentrated solution, introducing into the solution an acidic dehydration agent to promote layer separation, and introducing an inorganic chloride into the solution to effect a practically complete reaction with the chromic anhydride forming chromyl chloride and resultant formation of one layer of substantially pure liquid chromyl chloride comprising the original chromyl chloride and the produced chromyl chloride and another liquid layer comprising acid and absorbed water, the amount of the acidic dehydrating agent incorporated in the solution being such that at the conclusion of the reaction the acid layer comprises from 50% to 85% by weight of acid.

References Cited in the file of this patent
FOREIGN PATENTS

| | | |
|---|---|---|
| 524,559 | Germany | May 7, 1931 |
| 472,089 | Great Britain | Sept. 16, 1937 |

OTHER REFERENCES

Chem. Abs. 44, 2879 (1950).

Mellor: "Treatise on Inorganic and Theoretical Chemistry," vol. 11, page 392 (1931).

Gmelin-Kraut: "Handbuch der Anorganisch Chemie," vol. 3.1, page 441 (1912).